(12) United States Patent
Sharp, Jr. et al.

(10) Patent No.: US 7,316,241 B1
(45) Date of Patent: Jan. 8, 2008

(54) STEAM TRAP

(75) Inventors: James H. Sharp, Jr., Columbia, SC (US); Bernard J. Radle, Jr., Blythewood, SC (US)

(73) Assignee: Spirax Sarco, Inc., Blythewood, SC (US)

( * ) Notice: Subject to any disclaimer, the term of this patent is extended or adjusted under 35 U.S.C. 154(b) by 410 days.

(21) Appl. No.: 11/044,880

(22) Filed: Jan. 27, 2005

(51) Int. Cl.
*F16T 1/16* (2006.01)

(52) U.S. Cl. ...................... 137/183; 137/375

(58) Field of Classification Search ........... 137/533.19, 137/533, 375, 377, 800, 183; 236/59, 58, 236/43, 93 R, 101 B; 251/44, 42, 368; 215/316
See application file for complete search history.

(56) References Cited

U.S. PATENT DOCUMENTS

| | | | |
|---|---|---|---|
| 2,051,732 A | 8/1936 | McKee | |
| 2,379,712 A * | 7/1945 | Hildebrecht | 137/66 |
| 2,945,505 A | 7/1960 | Hansen et al. | |
| 3,170,477 A | 2/1965 | Scott, Jr. et al. | |
| 3,418,789 A | 12/1968 | Hoffman et al. | |
| 3,467,309 A * | 9/1969 | Fujiwara | 236/59 |
| 3,536,090 A * | 10/1970 | Scott, Jr. | 137/183 |
| 3,537,682 A * | 11/1970 | Priese | 251/214 |
| 3,583,846 A * | 6/1971 | Kimball et al. | 431/142 |
| 3,664,362 A * | 5/1972 | Weise | 137/102 |
| 3,664,363 A | 5/1972 | Miyawaki | |
| 3,720,223 A * | 3/1973 | Goellner | 137/183 |
| 3,807,429 A * | 4/1974 | Breton | 137/183 |
| 4,013,220 A | 3/1977 | Zoller | |
| 4,161,278 A | 7/1979 | Klann et al. | |
| 4,427,149 A * | 1/1984 | Adachi | 236/59 |
| 4,668,943 A * | 5/1987 | Bunker et al. | 340/606 |
| 4,736,886 A | 4/1988 | Oike | |
| 5,189,877 A * | 3/1993 | Wells et al. | 60/293 |
| 5,921,268 A * | 7/1999 | Soares | 137/183 |
| 5,934,316 A * | 8/1999 | Helmsderfer | 137/375 |

FOREIGN PATENT DOCUMENTS

EP 0211080 2/1987

OTHER PUBLICATIONS

Product sheet entitled "Spirax Sarco TD 52 Thermodynamic Steam Trap," copyright 1995, 2 pages.

* cited by examiner

*Primary Examiner*—John Rivell
*Assistant Examiner*—Craig Price
(74) *Attorney, Agent, or Firm*—Nelson Mullins Riley & Scarborough LLP

(57) ABSTRACT

A steam trap comprises a trap body having an inlet and an outlet each defining inner threads. The trap body further includes a spigot defining external threads. Also provided is a cap defining internal threads for engaging the external threads of the spigot of the trap body. A valve element freely moves inside a trap chamber defined between an inner surface of the cap and the valve seat of the spigot. The cap defines a top surface on which a disc of thermally insulative material is juxtaposed. A cup-shaped cover, which may carry indicia such as manufacturer name and model number, is received over the thermally insulative disc.

5 Claims, 4 Drawing Sheets

STEAM TRAP

BACKGROUND OF THE INVENTION

The present invention relates generally to steam traps used in steam distribution systems. More particularly, the invention relates to a steam trap adapted to control the escape of latent heat.

Steam traps, which are essentially automatic valves used to discharge condensate, are widely used in steam distribution systems. In operation, flash steam within the trap chamber of such devices functions to keep the valve closed. As the trap cools, the steam condenses and fluid pressure in the inlet passage forces the valve element off its seat. Condensate then passes through the trap, which eventually causes the valve element to again engage the seat.

The useful life of a steam trap is directly related to its cycle rate. Cycle rate is, in turn, related to latent heat loss. Accordingly, it is often desirable to control loss of such heat in a steam trap. While various configurations have been proposed to limit such heat loss, room exists in the art for novel constructions.

SUMMARY OF THE INVENTION

In accordance with one aspect, the present invention provides a steam trap comprising a trap body defining a seating face. A cap is fitted to the trap body and has a stop face. The trap body and the cap thus define a trap chamber. A thermally insulative element is juxtaposed to the cap. A valve element is located in the trap chamber and is displaceable between limit positions defined by the stop face and the seating face.

In some exemplary embodiments, the thermally insulative element substantially covers a top surface of the cap. Often, the thermally insulative element may comprise a disc of thermally insulative material such as a ceramic material. Preferably, the cap may define a wrenchable portion having a plurality of flats for engagement by a wrench.

Often, the cap may include a pin extending from the top surface thereof. In such embodiments, the insulative disc may define a central bore in which the pin is received. In addition, embodiments are contemplated in which a cover is received over the insulative disc. The cover may be attached to the pin so as to be securely maintained in position. In some embodiments, the cover may be configured having a top portion from which a circumferential skirt depends.

A further aspect of the present invention provides a steam trap comprising a trap body having an inlet and an outlet each defining inner threads. The trap body further includes a spigot defining external threads. Also provided is a cap defining internal threads for engaging the external threads of the spigot of the trap body. The cap defines a top surface on which a disc of thermally insulative material is juxtaposed. The disc substantially covers the top surface of the cap in this aspect of the invention.

Still further aspects of the present invention are achieved by an assembly for use with a steam trap body. The assembly comprises a cap defining internal threads for engaging external threads of a spigot of the steam trap body. The cap further defines a top surface on which a disc of ceramic material is juxtaposed. The disc substantially covers the top surface of the cap. A cover, configured having a top portion from which a circumferential skirt depends, is received over the insulative disc.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
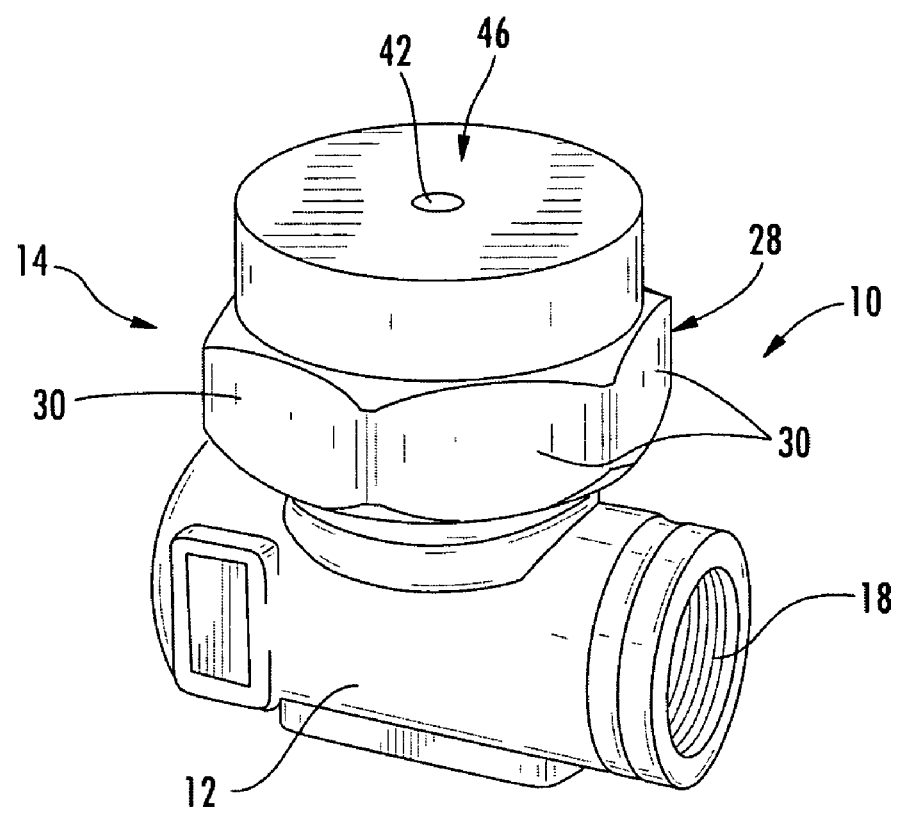
FIG. 1 is a perspective view of a steam trap constructed in accordance with the present invention.

Repeat use of reference characters in the present specification and drawings is intended to represent same or analogous features or elements of the invention.

DETAILED DESCRIPTION OF THE EMBODIMENTS

It is to be understood by one of ordinary skill in the art that the present discussion is a description of exemplary embodiments only and is not intended as limiting the broader aspects of the present invention, such broader aspects being embodied in the exemplary constructions.

Figure 2:
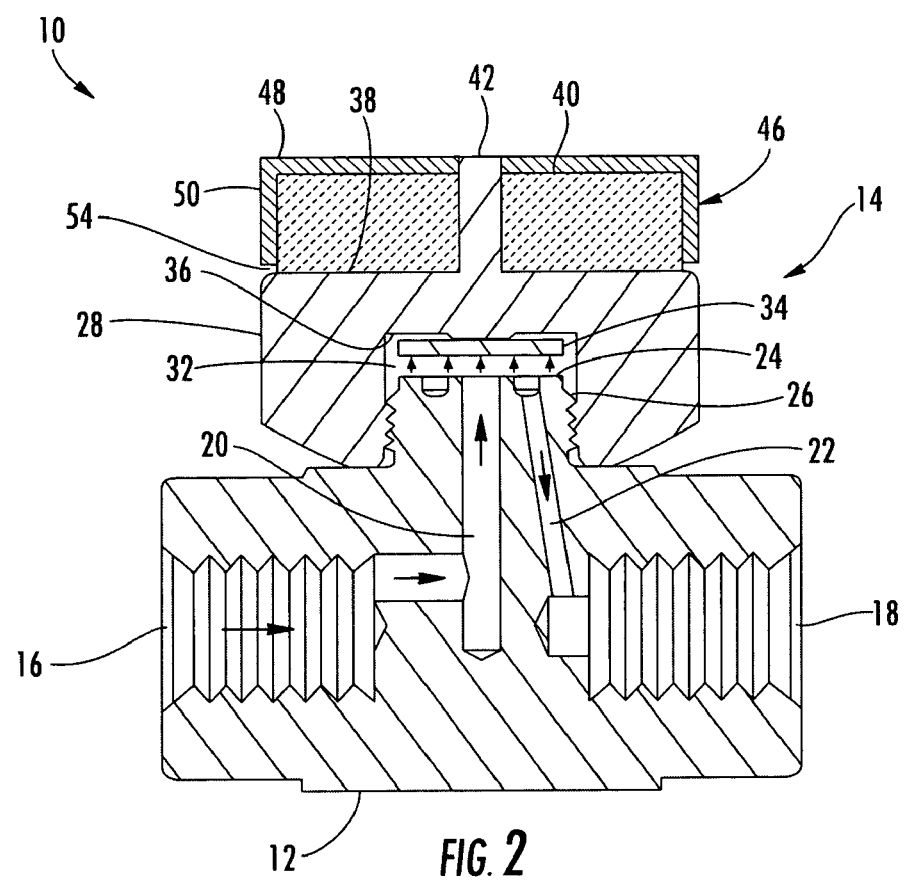
FIG. 2 is cross-sectional view of the steam trap of FIG. 1.
Figure 3:
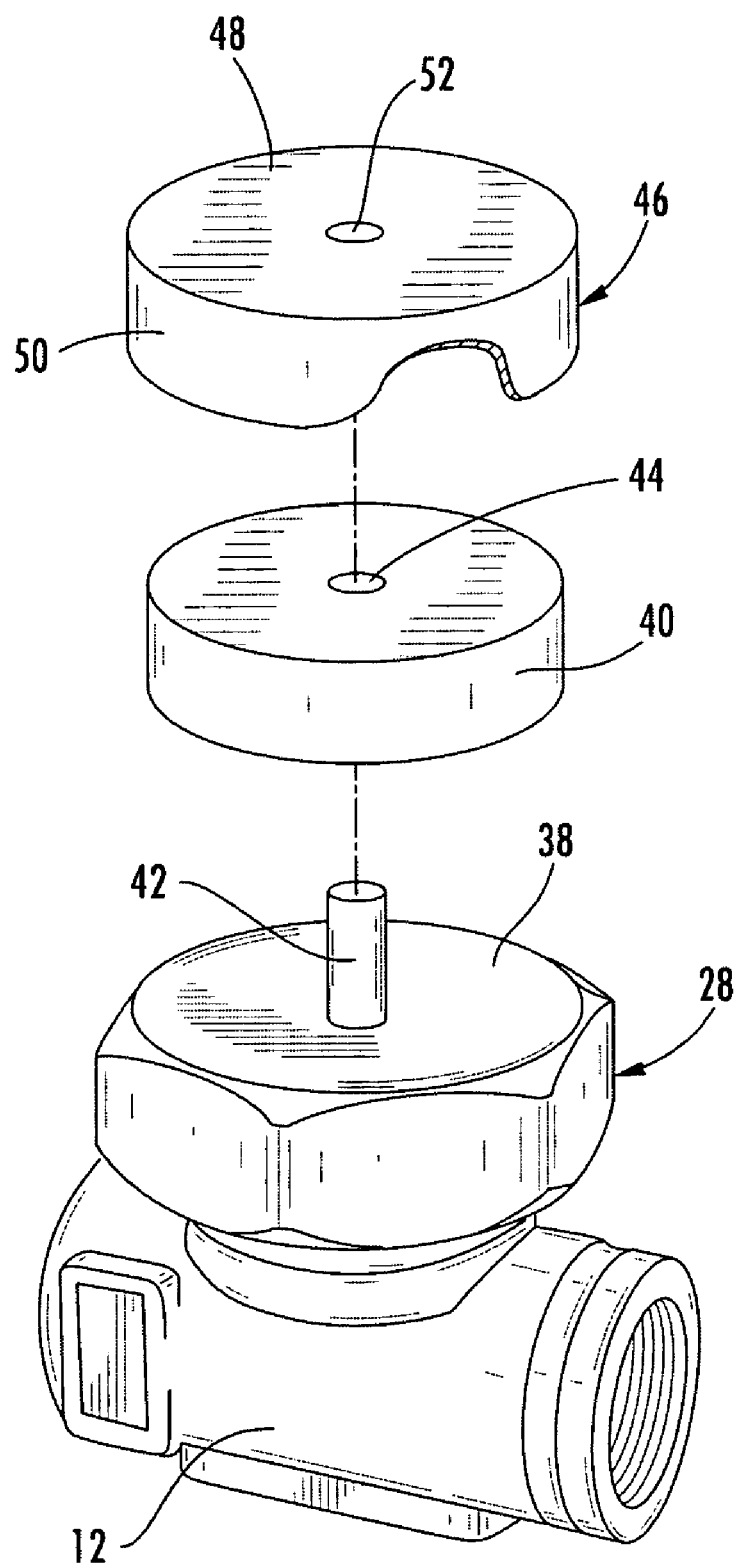
FIG. 3 is a view similar to FIG. 1 with components of the cap separated for purposes of illustration.

FIG. 1 illustrates a novel steam trap 10 constructed in accordance with the present invention. Steam trap 10 has a trap body 12 to which a cap assembly 14 is attached. Referring now also to FIG. 2, trap body 12 defines an inlet 16 and an outlet 18 through which the condensate flows. In this embodiment, inlet 16 and outlet 18 define internal threads for connection to a pipeline.

Inlet 16 is connected to an inlet passage 20, whereas outlet 18 is connected to outlet passages 22. Inlet passage 20 and outlet passage 22 emerge at a seating face 24 located at the end of a spigot 26. As can be seen, cap assembly 14 includes a cap 28 having internal threads engaging outer threads on spigot 26.

As can be seen most clearly in FIG. 1, cap 28 preferably defines a series of flats 30 about its periphery for engagement by a wrench.

Along with seating face 24, cap 28 defines a trap chamber 32 in which a valve element in the form of a metal disc 34 is located. Disc 34 is movable upwardly and downwardly within chamber 32, its movement being limited by seating face 24 and an opposed stop face 36 on the interior of cap 28. Typically, body 12 and cap 28 are made from metal such as stainless steel. As a result, these components have a relatively high thermal conductivity. As noted above, latent heat loss from a steam trap causes the valve to cycle at a higher rate than otherwise desired.

In accordance with the present invention, it has been found that much of this heat loss occurs at the top surface 38 of the cap. Thus, a thermally insulated element, such as insulative disc 40, may be juxtaposed to top surface 38 in order to substantially reduce the heat loss. In the illustrated embodiment, for example, disc 40 is configured to substantially cover the entirety of top surface 38. Preferably, for example, disc 40 will have a diameter that just fits inside the hexagon of the cap to provide maximum coverage.

Although disc 40 may be made of any suitable insulative material (such as an insulating fiber with a low "R" value), it is often formed of a hard ceramic disc in presently preferred embodiments. In this regard, the disc may preferably have a thickness of ⅜ inch. While being more expensive than some alternatives, ceramic provides a very stable and uniform material with very consistent insulation properties. Any industrial grade ceramic is believed suitable, and it does not need to be alloyed with anything.

It is contemplated that disc 40 may be attached to top surface 38 of cap 28 by any suitable means. In the illustrated embodiment, however, cap 28 includes a vertical pin 42 which is received in a central bore 44 defined in disc 40. Preferably, pin 42 and bore 44 are dimensioned to form a tight fit between these two components. As a result, disc 40 will be maintained securely in proximity to top surface 38 of cap 28, without rotating.

In presently preferred embodiments, cap assembly 14 further includes a cover 46 fitted over insulative disc 40. In this case, cover 46 is configured having a top portion 48 from which a circumferential skirt 50 integrally depends. As a result, cover 46 forms a cup shaped element in which insulative disc 40 is received.

Top portion 48 defines a hole 52 in which an end portion of pin 42 is received. Preferably, the length of pin 42 will be such that its end surface will be substantially flush with top portion 48 of cover 46 when the entire assembly is put together (FIG. 2). Alternatively, hole 52 can be eliminated in which case the length of pin 42 will preferably be equal to the thickness of disc 40. Either way, a small spot weld may be made between pin 42 and cover 46 to maintain it and disc 40 securely in position.

In presently preferred embodiments, cover 46 may be stamped from thin metal. For example, in some preferred embodiments, metal having a thickness of generally about 30 thousandths of an inch may be used for this purpose. Preferably, skirt 50 is dimensioned to leave a slight air gap 54 between it and top surface 38 of cap 28. This has been found desirable to reduce thermal conduction which could cause cover 46 to undesirably function as a heat exchanger.

Figure 4:
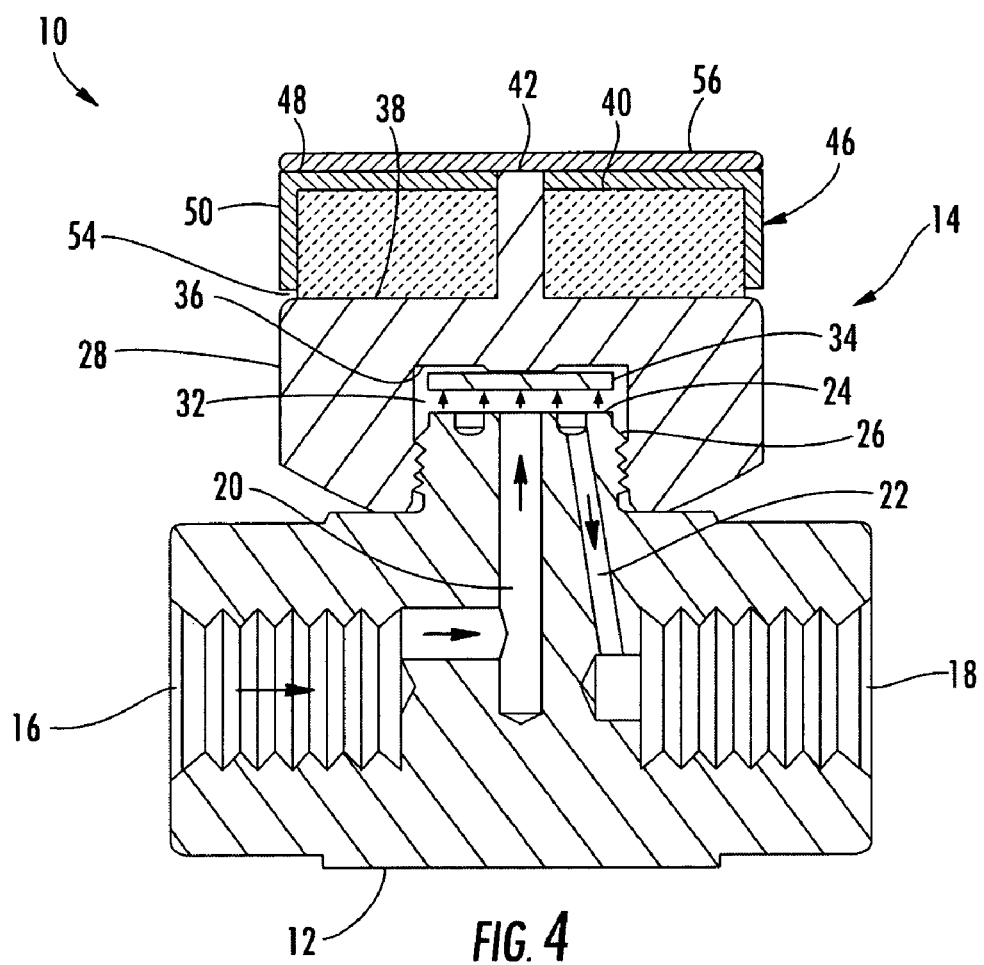
FIG. 4 is a cross-sectional view similar to FIG. 2 but showing an alternative nameplate added to the top of the cap.

Advantageously, various indicia, such as manufacturer name, part number and the like, may be applied on the top portion 48 of cover 46 for both aesthetic and identification reasons. Alternatively, a separate plate 56 (FIG. 4) with this information may be attached to the top portion of cover 46. In this embodiment, plate 56 can be spot welded to pin 42 to maintain disc 40 and cover 46 in place. Although plate 56 is depicted with a diameter approximately equal to that of top portion 48, embodiments are contemplated in which the diameter of plate 56 is either greater or less.

In operation, condensate reaches trap 10 at inlet 16. The condensate flows through inlet passage 20, lifting disc 34 off of seating face 24. The condensate continues through outlet passages 22 and leaves trap 10 through outlet 18.

As steam approaches the trap, the temperature of the condensate increases. When the hot condensate passes between disc 34 and seating face 24, a portion of it evaporates and forms flash steam. The resulting expansion causes an increase in volume of the flowing mixture of flash steam and condensate, thus increasing the velocity. This causes a local reduction in pressure between disc 34 and seating face 24, which pushes disc 34 into engagement with seating face 24.

A steam bubble within chamber 32 retains disc 34 against seating face 24, thus resisting the pressure in the upstream pipeline. It will be appreciated, however, that loss of latent heat will cause this steam bubble to collapse prematurely which results in excessive cycling of steam trap 10. The presence of insulative disc 40 has been found to reduce the cycle rate by between 25% to 30%, which facilitates a possible increase in the useful life of the steam trap. In addition, disc 40 has been found to reduce the temperature of the condensate before discharge making steam 10 trap more energy efficient.

It can thus be seen that the present invention provides a steam trap having a novel configuration. While preferred embodiments of the invention have been shown and described, modifications and variations may be made thereto by those of skill in the art without departing from the spirit and scope of the present invention. It should also be understood that aspects of those embodiments may be interchangeable in whole or in part. Furthermore, those of ordinary skill in the art will appreciate that the foregoing description is by way of example only and is not intended to be limitative of the invention described herein.

What is claimed is:

1. A steam trap comprising:
   a trap body having an inlet and an outlet, said inlet and said outlet each defining inner threads;
   said trap body further having a spigot, said spigot defining external threads;
   a cap defining internal threads for engaging said external threads of said spigot of said trap body, said cap defining a top surface; and
   a disc of thermally insulative material juxtaposed to said top surface of said cap;
   a cover received over said disc, said cover configured as having a top portion from which a circumferential skirt depends; and
   wherein said circumferential skirt is dimensioned so as to provide a gap between said circumferential skirt and a top surface of said cap.

2. A steam trap as set forth in claim 1, wherein said thermally insulative material comprises a ceramic material.

3. A steam trap as set forth in claim 1, wherein said cap includes a pin extending from said top surface thereof, said disc defining a central bore in which said pin is received.

4. A steam trap as set forth in claim 3, wherein said cover is attached to said pin so as to be securely maintained in position.

5. A steam trap as set forth in claim 1, wherein said cap defines a wrenchable portion having a plurality of flats for engagement by a wrench.

* * * * *